United States Patent
Andoh

(10) Patent No.: US 7,352,993 B2
(45) Date of Patent: Apr. 1, 2008

(54) DATA REPRODUCING APPARATUS AND DATA REPRODUCING SYSTEM

(75) Inventor: Kunihiro Andoh, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 1188 days.

(21) Appl. No.: 10/106,038

(22) Filed: Mar. 27, 2002

(65) Prior Publication Data

US 2002/0141092 A1 Oct. 3, 2002

(30) Foreign Application Priority Data

Mar. 29, 2001 (JP) ............................ P 2001-096282

(51) Int. Cl.
*H04H 7/00* (2006.01)
(52) U.S. Cl. .................... 455/3.06; 455/3.02; 455/66.1; 455/70; 455/96; 455/412.1; 455/456.1; 455/500; 360/55
(58) Field of Classification Search ............... 455/3.06, 455/3.01, 3.02, 66.1, 70, 98, 145, 500, 412.1, 455/456.1, 457, 507, 509, 510, 515, 517, 455/518, 521, 564, 96; 360/55, 32, 51, 72.2, 360/13, 18, 53, 48, 72.1; 340/7.1, 7.28; 386/95
See application file for complete search history.

(56) References Cited

U.S. PATENT DOCUMENTS

| | | | |
|---|---|---|---|
| 5,345,594 A | * | 9/1994 | Tsuda ............................ 455/18 |
| 5,553,055 A | * | 9/1996 | Yokota et al. ........... 369/124.08 |
| 5,649,305 A | * | 7/1997 | Yoshida ........................ 455/70 |
| 6,031,828 A | * | 2/2000 | Koro et al. .................. 370/336 |
| 6,175,730 B1 | * | 1/2001 | Groeger ...................... 455/355 |
| 6,208,855 B1 | * | 3/2001 | Tanaka ......................... 455/59 |
| 6,615,381 B1 | * | 9/2003 | Fukuda et al. .............. 714/746 |
| 6,618,551 B1 | * | 9/2003 | Tanaka et al. ................ 386/96 |
| 6,792,245 B1 | * | 9/2004 | Kawai ....................... 455/3.01 |
| 6,832,040 B2 | * | 12/2004 | Sakuramoto et al. ......... 386/95 |

\* cited by examiner

*Primary Examiner*—Philip J. Sobutka
*Assistant Examiner*—Shaima Q. Aminzay
(74) *Attorney, Agent, or Firm*—McGinn IP Law Group, PLLC

(57) ABSTRACT

A data reproducing system of the invention includes a data transmitter for transmitting a data signal containing audio data by air and a data receiver for receiving the data signal by air from the data transmitter. The data receiver includes a data receiving section for receiving a data signal by air, a receiving ROM for storing specific apparatus-specific ID in advance, data extraction member for extracting the apparatus-specific ID contained in the data signal received by air, data determination member for determining whether the extracted apparatus-specific ID is in a predetermined relationship with the apparatus-specific ID stored in the receiving ROM, and reproducing member for extracting audio data from the data signal received by air and regenerating the audio data on a decoding section once the predetermined relationship is determined.

20 Claims, 4 Drawing Sheets

DATA REPRODUCING APPARATUS AND DATA REPRODUCING SYSTEM

BACKGROUND OF THE INVENTION

The present to a data reproducing apparatus that receives a data signal by air from for example a data transmitter and regenerates audio data contained in the data signal and a data reproducing system including these data reproducing apparatus (data receiver) and a data transmitter.

Related art data reproducing apparatus such as audio apparatus includes for example those having audio sources for regenerating recording media mounted on the apparatus such as a cassette tape, CD and MD, for example floor-standing audio apparatus, portable audio apparatus, and car-mounted audio apparatus.

According to the floorstanding audio apparatus, the user can enjoy reproducing of music in the room by regenerating the recording media.

According to the portable audio apparatus, the user can enjoy reproducing of music while walking by regenerating the recording media.

According to the car-mounted audio apparatus, the user can enjoy reproducing of music in the car by regenerating the recording media.

According to the aforementioned related art data reproducing apparatus, in case the user carrying portable audio apparatus moves into a room or a car and wishes to reproduce the same music on the floorstanding audio apparatus or car-mounted audio apparatus, the user must take out the recording media under reproducing from the portable audio apparatus and mount the recording media on the floorstanding audio apparatus or car-mounted audio apparatus. Such replacement work or switching work inevitably interrupts reproducing of music.

SUMMARY OF THE INVENTION

This invention is proposed in view of the aforementioned problem and aims at providing data reproducing apparatus and a data reproducing system that assures continuity of audio data under reproducing without requiring replacement or switching of recording media.

In order to attain the objective, according to a first aspect, a data reproducing apparatus of the invention includes receiving member for receiving a data signal by air from separate apparatus, data storage member for storing specific identification data in advance, data extraction member for extracting identification data contained in the data signal received by air by the receiving member, data determination member for determining whether the identification data extracted by the data extraction member is in a predetermined relationship with the identification data stored in the data storage member, and reproducing member for extracting audio data from the data signal received by air by the receiving member and regenerating the audio data once the predetermined relationship is determined by the data determination member.

Thus, according to a data reproducing apparatus of the invention, when the identification data in the data signal being received and the identification data stored in the storage member are in a predetermined relationship, audio data is extracted from the data signal being received and regenerated output of the audio data is provided. This ensures the continuity of audio data under reproducing on separate apparatus, without requiring replacement or switching of recording media.

According to a second aspect, a data reproducing apparatus of the invention is characterized in that the apparatus includes switching member for performing switching operation in case the separate apparatus is placed in a predetermined location and that the receiving member starts receiving operation in accordance with the switching operation of the switching member.

Thus, according to a data reproducing apparatus of the invention, the receiving member starts receiving operation in accordance with the switching operation of the switching member. This reduces the power consumption of the entire data reproducing apparatus while reducing the load on the receiving member assumed in case the separate apparatus is not located in a predetermined location, that is, not in the area receiving the data signal.

In order to attain the objective, according to a third aspect, a data reproducing system of the invention includes a data transmitter for transmitting a data signal containing audio data by air and a data receiver for receiving the data signal by air from the data transmitter. The data receiver includes receiving member for receiving a data signal by air from the data transmitter, data storage member for storing specific identification data in advance, data extraction member for extracting identification data contained in the data signal received by air by the receiving member, data determination member for determining whether the identification data extracted by the data extraction member is in a predetermined relationship with the identification data stored in the data storage member, and reproducing member for extracting audio data from the data signal received by air by the receiving member and regenerating the audio data once the predetermined relationship is determined by the data determination member.

Thus, according to a data reproducing system of the invention, when the identification data in the data signal being received and the identification data stored in the storage member are in a predetermined relationship, audio data is extracted from the data signal currently being received and the audio data is played back. This ensures the continuity of audio data under reproducing on a data transmitter, without requiring replacement or switching of recording media.

According to a forth aspect, a data reproducing system of the invention is characterized in that the data receiving apparatus includes switching member for performing switching operation in case the data transmitter is placed in a predetermined location and that the receiving member starts receiving operation in accordance with the switching operation of the switching member.

Thus, according to a data reproducing system of the invention, the receiving member starts receiving operation in accordance with the switching operation of the switching member. This reduces the power consumption of the entire data receiving apparatus while reducing the load on the receiving member assumed in case the data transmitter is not located in a predetermined location, that is, not in the area receiving the data signal.

Further, according to a fifth aspect, a data reproducing apparatus according to aspect 1, further includes member for detecting approach of the separate apparatus, wherein the data reproducing apparatus provides regenerated output of the audio data in case the approach of the separate apparatus is detected and the identification data is in a predetermined relationship.

Still further, according to a sixth aspect, the data reproducing apparatus according to aspect 5, wherein the approach of the separate apparatus is detected based on the receiving state of the data signal.

Still further, according to a seventh aspect, the data reproducing apparatus according to aspect 5, wherein the approach of the separate apparatus is detected based on detection of the separate apparatus being placed in a predetermined location.

Still further, according to an eighth aspect, the data reproducing apparatus according to aspect 3, further includes member for detecting approach of the separate apparatus, wherein the data reproducing apparatus provides regenerated output of the audio data in case the approach of the separate apparatus is detected and the identification data is in a predetermined relationship.

Still further, according to a ninth aspect, the data reproducing apparatus according to aspect 3, wherein the approach of the separate apparatus is detected based on the receiving state of the data signal.

DETAILED DESCRIPTION OF THE PREFERRED EMBODIMENTS

Figure 1:
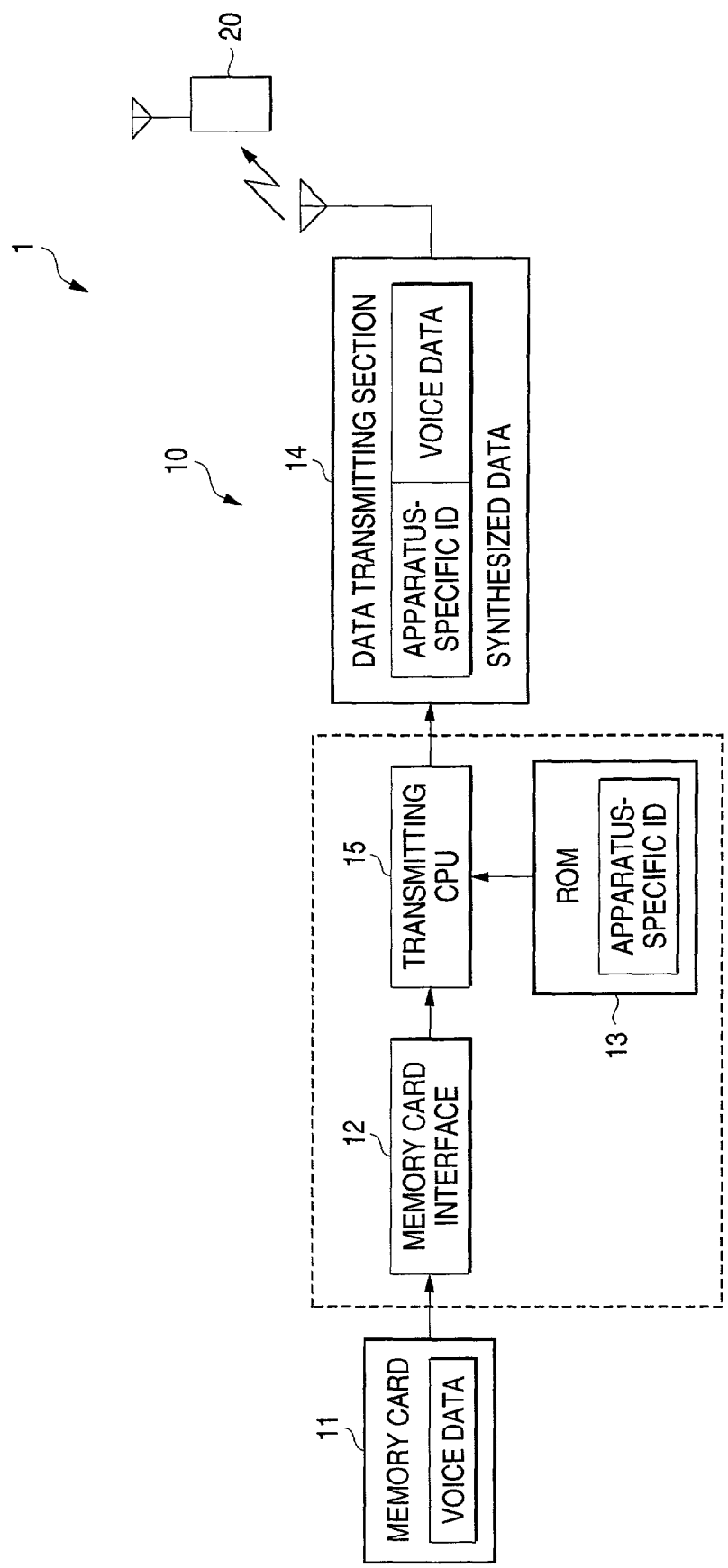
FIG. 1 is a block diagram showing the general configuration of a data transmitter in a data reproducing system shown in the embodiment of the invention.

A data reproducing system shown in an embodiment of the invention will be described referring to the drawings. FIG. 1 is a block diagram showing the general configuration of a data reproducing system shown in the embodiment of the invention and the general configuration of the interior of a data transmitter in the system.

A data reproducing system 1 shown in FIG. 1 includes a data transmitter 10 for transmitter a data signal containing audio data by air and a data receiver 20 for receiving the data signal by air from the data transmitter 10. A data signal is transmitted via wireless communications such as radio waves and infrared rays from the data transmitter 10.

The data transmitter 10 includes for example a memory card 11 as a recording medium where audio data such as music is recorded, a memory card interface 12 for inputting a data signal containing the audio data recorded on the memory card 11, a transmitting ROM 13 for storing various information, a data transmitting section 14 for transmitting a data signal containing audio data input from the memory card interface 12 by air to the data receiver 20, and a transmitting CPU 15 for controlling the entire data transmitter 10.

The transmitting ROM 13 includes a nonvolatile memory or a flash ROM and stores a common apparatus-specific ID in the data reproducing system 1, for example between the data receiver 20 and the data transmitter 10. The apparatus-specific ID corresponds to identification data for preventing jamming and information leakage external to the system.

The transmitting CPU 15 synthesizes the audio data input from the memory card interface 12 and an apparatus-specific ID stored in the transmitter ROM 13 in a predetermined data format to generate a data signal.

Figure 2:
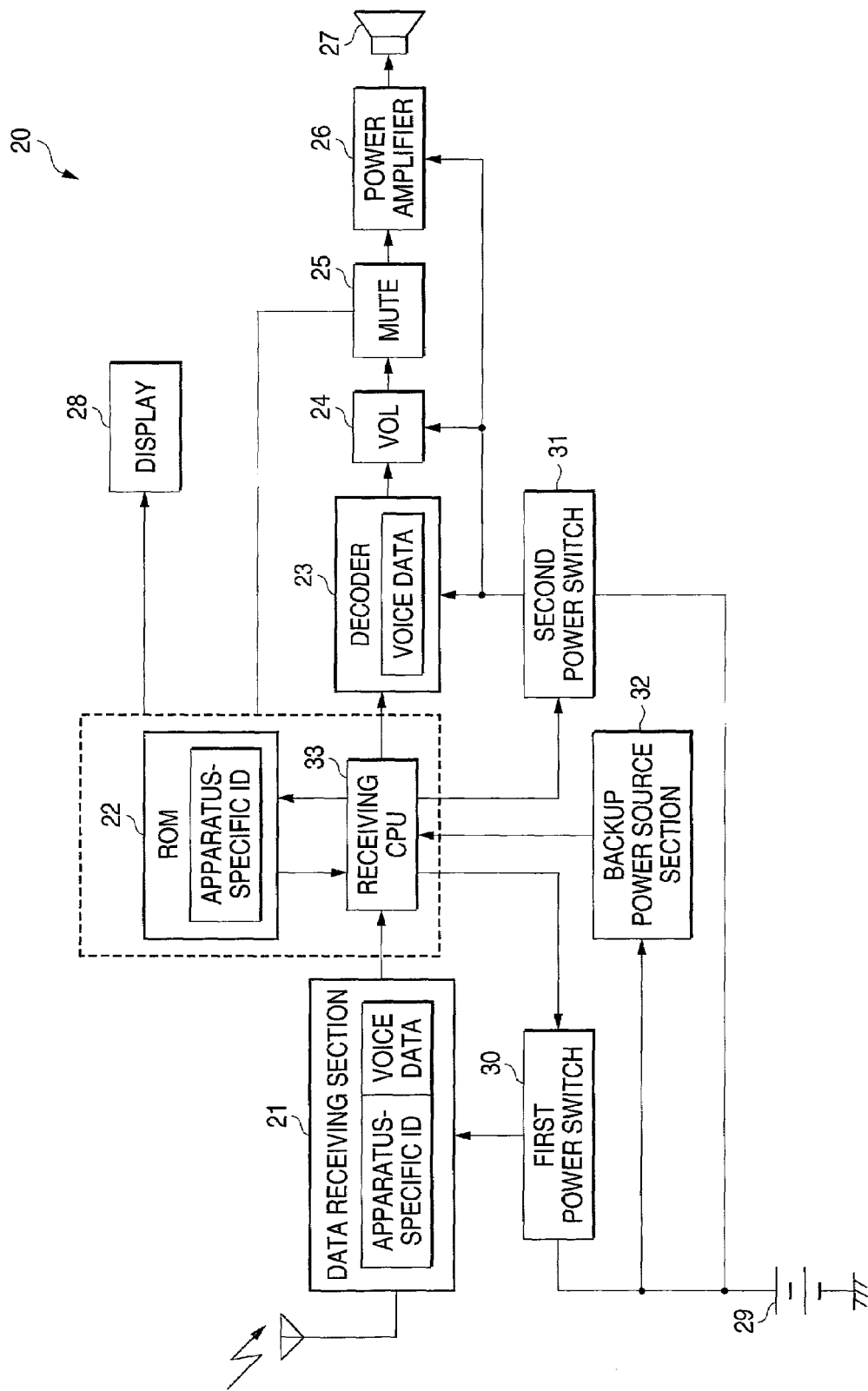
FIG. 2 is a block diagram showing the general configuration of the interior of a data receiver in a data reproducing system shown in the embodiment of the invention.

FIG. 2 is a block diagram showing the general configuration of the interior of a data receiver 20 in the data reproducing system 1 shown in the embodiment of the invention.

Referring to FIG. 2, a data receiver 20 includes a data receiving section 21 for receiving a data signal from the data transmitter 10, a receiving ROM 22 for storing various information, a decoder 23 for decoding the audio data contained in the data signal received by the data receiving section 21 to a sound signal, a volume adjuster 24 for adjusting the volume of the sound signal, a muting section 25 for muting the sound signal, an amplifier 26 for amplifying the sound signal, a speaker 27 for outputting as voice the amplified sound signal, a display 28 for displaying various information, a battery 29 for feeding power to the entire data receiver 20, a first power switch 30 for feeding the power from the battery 29 to the receiving system such as the data receiving section 21, a second power switch 31 for feeding the power from the battery 29 to the decoder 23, the volume adjuster 24 and the amplifier 26, a backup power source section 32 as a backup power source, and a receiving CPU 33 for controlling the entire data receiver 20.

The receiving ROM 22 includes a nonvolatile memory or a flash ROM and stores an apparatus-specific ID that coincides with the apparatus-specific ID stored in the transmitting ROM 13.

Figure 3:
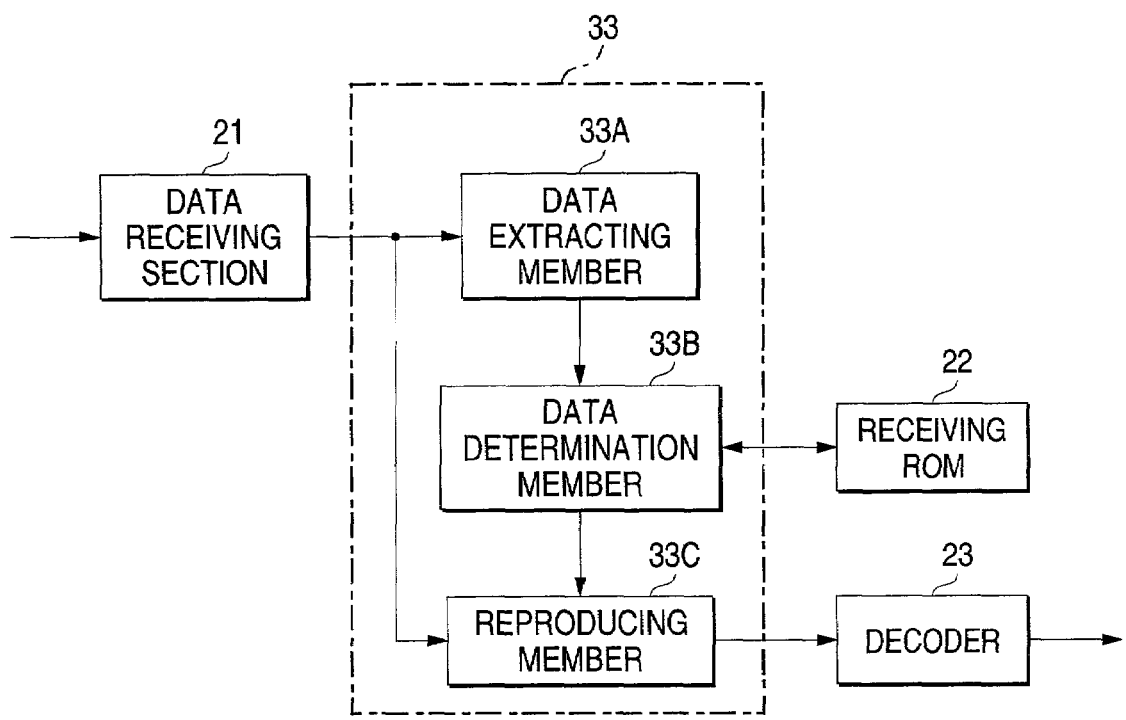
FIG. 3 is a block diagram showing the general configuration of the interior of a receiving CPU in a data receiver in a data reproducing system shown in the embodiment of the invention.

Referring to FIG. 3, the receiving CPU 33 includes data extracting member 33A for extracting an apparatus-specific ID from the data signal received by the data receiving section 21, data determination member 33B for determining whether the apparatus-specific ID coincides with the apparatus-specific ID stored in the receiving ROM 22, and reproducing member 33C for extracting only the audio data from the data signal and provides regenerated output of audio data to the decoder 23 in case the apparatus-specific IDs coincide with each other.

The first power switch 30 performs intermittent power through ON/OFF control until the data receiving section 21 acquires a data signal as well as performs power feeding through ON control while a data signal is being acquired by the data receiving section 21. The first power switch 30 performs intermittent power feeding through OFF control in case the apparatus-specific IDs do not coincide with each other in the data determination member 33B even when a data signal is acquired by the data receiving section 21.

The second power switch 31 performs power feeding through ON control only when the apparatus-specific IDs coincide with each other in the data determination member 33B. In this way, it is possible to reduce the power consumption of the entire data receiver 20 through ON/OFF control of the first power switch 30 and the second power switch 31.

Figure 4:
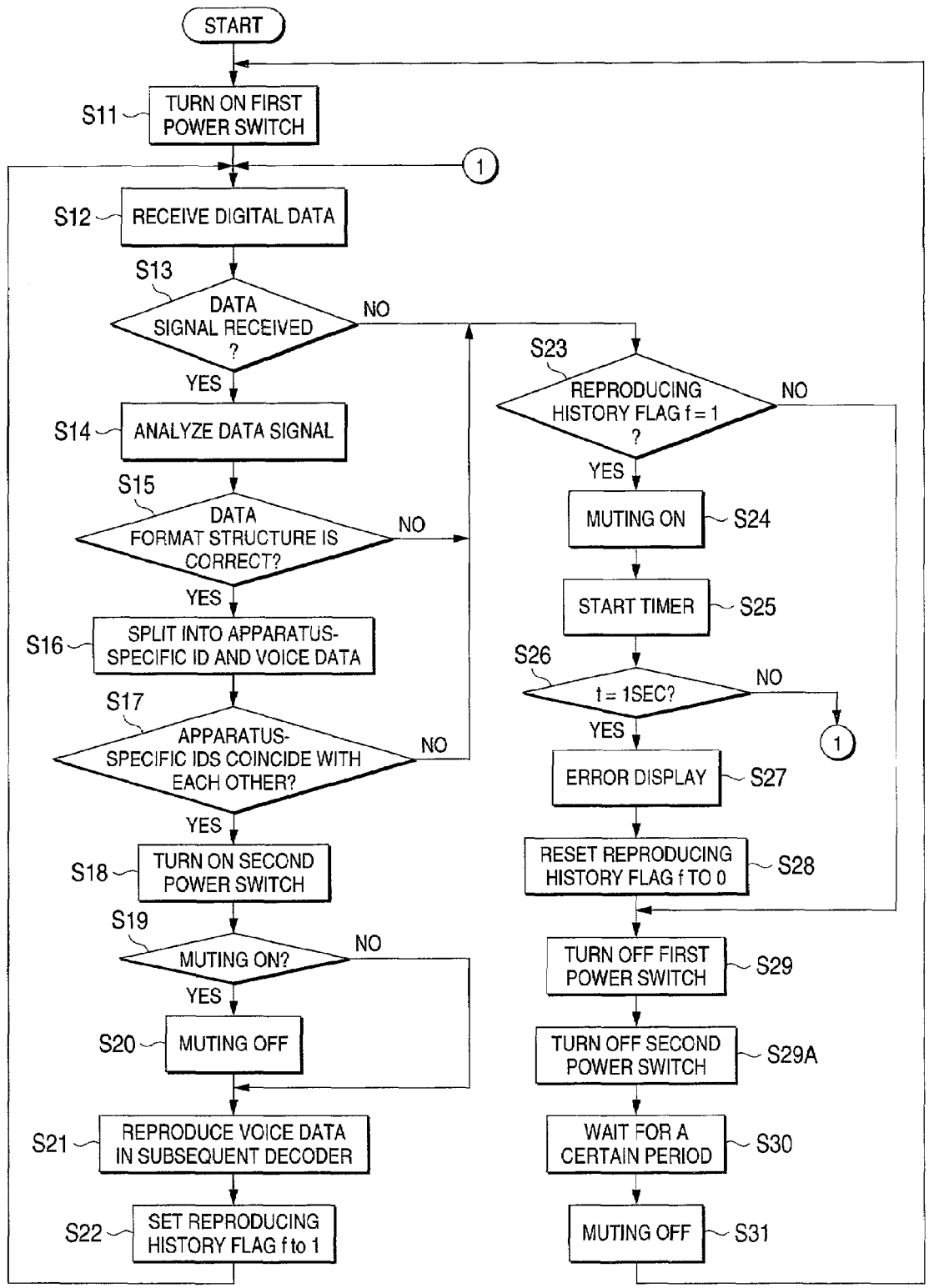
FIG. 4 is a flowchart showing the processing in the data receiver concerning a data reproducing system shown in the embodiment.

Next, operation of a data reproducing system 1 shown in the embodiment will be described. FIG. 4 is a flowchart showing the processing in the data receiver 20 of the data reproducing system 1 shown in the embodiment.

In FIG. 4, the receiving CPU 33 of the data receiver 20 constantly receives power from the backup power source section 32. The receiving CPU 33 detects feeds power to the receiving system such as the data receiving section 21 by detecting for example that the accessory switch of a car is turned ON and turning ON the first power switch 30 (step S11). The receiving CPU 33 then monitors a data signal from the data transmitter 10 via the data receiving section 21 (step S12).

The receiving CPU 33 determines whether a data signal is received by the data receiving section 21 (step S31). In case the data signal is received, the receiving CPU 33 analyzes the data signal (step S14) and determines whether the data format structure of the data signal is correct (step S15). The data format structure of the data signal includes an apparatus-specific ID and audio data in this order.

In case the data format structure of the data signal is correct, the data extracting member 33A of the receiving CPU 33 splits the data signal into an apparatus-specific ID and audio data to extract the apparatus-specific ID (step S16).

The data determination member 33B of the receiving CPU 33 determines whether the extracted apparatus-specific ID coincides with the apparatus-specific ID stored in the receiving ROM 22.

The receiving CPU 33, determining that the apparatus-specific IDs coincide with each other, turns ON the second power switch 31 so that power may be fed to the voice output system such as the decoder 23, volume adjuster 24 and the amplifier 26. It is possible to suppress the power consumption of the entire data receiver 20 to the minimum through ON/OFF operation of the second power switch 31.

After the ON operating of the second power switch 31, the receiving CPU 33 determines whether the muting section 25 is ON (step S19).

The reproducing member 33C of the receiving CPU 33, determining that the muting section 25 is ON, turns OFF the muting section 25 (step S20), provides decoded output of the split audio data to the decoding section 23 (step S21), sets the reproducing history flag to "1" (step S22), then execution proceeds to step 12.

The reproducing history flag is a setting flag to indicate whether the data receiver 20 is in reproducing operation. When this flag is set to "1", it indicates that the data receiver 20 is in reproducing operation.

In case a data signal is not received in step S13, the receiving CPU 33 determines whether the reproducing history flag is "1" (step S23). In case the reproducing history flag is "1", the receiving CPU 33 turns ON the muting section 25 (step S24) and starts a timer (not shown) in the receiving CPU 33 (step S25) to determine whether one second has elapsed in the timer.

In case one second has not elapsed in the timer, execution proceeds to step S12 to receive a data signal. In case one second has elapsed in the timer, the receiving CPU 33 assumes an error, displays error information on the display 28 (step S28) and turns OFF the first power switch 30 to suppress the power consumption of the receiving system (step S29). Further, the receiving CPU 33 turns OFF the second power switch 31 to suppress the power consumption of the voice output system (step S29A).

The receiving CPU 33 turns OFF the muting section 25 (step S31) after a certain period (for example one second) has elapsed (step S30). Execution then proceeds to step S11.

In case the data format structure of the data signal is incorrect in step S15 or in case the apparatus-specific IDs do not coincide with each other in step S17, execution proceeds to step S23 determine whether the reproducing history flag is "1". In case the reproducing history flag is "1", the receiving CPU 33 assumes an error in the data signal being received although reproducing is in progress, and turns ON the muting section 25 in step S24 so that different voice will not be output.

In case the reproducing history flag is "1" in step S23, execution proceeds to step S29.

According to the embodiment, in case the data receiver 20 is in a favorable data reception state with the data transmitter 10 and in case the apparatus-specific ID in the data signal being received coincides with the apparatus-specific ID stored in the receiving ROM 22, the data receiver 20 extracts audio data from the data signal being received and provides regenerated output of the audio data. This allows the data transmitter 10 to secure the continuity of the audio data under reproducing without requiring replacement or switching of recording media.

According to the invention, power is fed to the voice output system that provides regenerated output of audio data in a data signal only in case the data signal receiving state is favorable and the apparatus-specific ID in the data signal coincides with the apparatus-specific ID stored in the receiving ROM. This substantially reduces the power consumption of the entire data receiver 20.

In the data receiver 20 of the embodiment, the data signal from the data transmitter 10 is monitored by turning ON the first power switch 30 and feeding power to the receiving system of the data receiving section 21. Even in case for example the data transmitter 10 is outside the receiving area of the data receiver 20, the data signal from the data transmitter 10 is monitored. Feeding of corresponding power to the receiving system of the data receiving section 21 is required.

In order to reduce power consumption to the receiving system, switch member (not shown) may be provided in the data receiver 20 that performs switching operation in case the data transmitter 10 is placed in a predetermined position such as on a dashboard of a car where reception state between the data receiver 20 and the data transmitter 20 is favorable. Also the first power switch 30 may be turned ON in accordance with the switching operation of the switch member to feed power to the receiving system of the data receiving section 21.

The receiving CPU of the data receiver 20 constantly monitors the switching operation of the switch member and, detecting the switching operation, turns ON the first power switch 30 to start receiving operation of the data receiving section 21 in step S11 in FIG. 4.

According to the embodiment, receiving operation of the data receiving section 21 is started by turning ON the first power switch 30 in accordance with the switching operation of the switch member. This reduces the load on the data receiving section 21 assumed in case the data transmitter is not placed in a predetermined location, that is, not in the receiving area, as well as reduces power consumption to the receiving system, thereby substantially reducing the power consumption of the entire data receiver 20.

In a data reproducing system 1 shown in the embodiment, data transmission between the data transmitter 10 and the data receiver 20 may be performed in accordance with the "Bluetooth" radio connection technology.

According to data reproducing apparatus of the invention thus configured, when the identification data in the data signal being received and the identification data stored in the storage member are in a predetermined relationship, audio data is extracted from the data signal being received and the regenerated output of the audio data is provided. This ensures the continuity of audio data under reproducing on data transmission apparatus, without requiring replacement or switching of recording media.

What is claimed is:

1. A data reproducing apparatus comprising:
   a receiving member for receiving a data signal by air from a separate apparatus;
   a data storage member for storing specific identification data in advance;
   a data extraction member for extracting identification data contained in the data signal received by air by said receiving member;
   a data determination member for determining whether the identification data extracted by said data extraction member is in a predetermined relationship with the identification data stored in said data storage member; and
   a reproducing member for extracting audio data from the data signal received by air by said receiving member and regenerating the extracted audio data based upon the predetermined relationship being determined by said data determination member such that continuity of said extracted audio data being reproduced is maintained.

2. The data reproducing apparatus according to claim 1, further comprising:
a switching member for performing a switching operation when said separate apparatus is placed in a predetermined location, wherein
said receiving member starts said receiving operation in accordance with the switching operation of said switching member.

3. The data reproducing apparatus according to claim 1, further comprising:
a member for detecting an approach of said separate apparatus; wherein
said data reproducing apparatus provides regenerated output of the audio data when the approach of said separate apparatus is detected and the identification data is in said predetermined relationship.

4. The data reproducing apparatus according to claim 3, wherein the approach of said separate apparatus is detected based on a receiving state of the data signal.

5. The data reproducing apparatus according to claim 3, wherein the approach of said separate apparatus is detected based on detection of said separate apparatus being placed in a predetermined location.

6. A data reproducing system comprising:
a data transmitter for transmitting a data signal containing audio data by air; and
a data receiver for receiving the data signal by air from said data transmitter, wherein said data receiver comprises:
a receiving member for receiving a data signal by air from said data transmitter;
a data storage member for storing specific identification data in advance;
a data extraction member for extracting identification data contained in the data signal received by air by said receiving member;
a data determination member for determining whether the identification data extracted by said data extraction member is in a predetermined relationship with the identification data stored in said data storage member; and
a reproducing member for extracting audio data from the data signal received by air by said receiving member and regenerating the extracted audio data based upon the predetermined relationship being determined by said data determination member such that continuity of said extracted audio data being reproduced is maintained.

7. The data reproducing system according to claim 6, wherein said data receiver further comprises:
a switching member for performing switching operation in case said data transmitter is placed in a predetermined location; and
said receiving member starts a receiving operation in accordance with the switching operation of said switching member.

8. The data reproducing apparatus according to claim 6, further comprising:
a member for detecting an approach of said data transmitter,
wherein said data reproducing system provides regenerated output of the audio data when the approach of said data transmitter is detected and the identification data is in said predetermined relationship.

9. The data reproducing apparatus according to claim 6, wherein an approach of said data transmitter is detected based on a receiving state of the data signal.

10. A data reproducing apparatus comprising:
receiving means for receiving a data signal by air from a separate transmitting means;
data storage means for storing specific identification data in advance;
data extraction means for extracting identification data contained in the data signal received by air by said receiving means;
data determination means for determining whether the identification data extracted by said data extraction means is in a predetermined relationship with the identification data stored in said data storage means; and
reproducing means for extracting audio data from the data signal received by air by said receiving means and regenerating the extracted audio data based upon the predetermined relationship being determined by said data determination member such that continuity of said extracted audio data being reproduced is maintained.

11. The data reproducing apparatus according to claim 10, further comprising:
switching means for performing a switching operation when said separate transmitting apparatus is placed in a predetermined location, wherein
said receiving means starts said receiving operation in accordance with the switching operation of said switching means.

12. The data reproducing apparatus according to claim 10, further comprising:
means for detecting an approach of said separate transmitting means, wherein said data reproducing apparatus provides regenerated output of the audio data when the approach of said separate transmitting means is detected and the identification data is in said predetermined relationship.

13. The data reproducing apparatus according to claim 12, wherein the approach of said separate transmitting means is detected based on a receiving state of the data signal.

14. The data reproducing apparatus according to claim 12, wherein the approach of said separate transmitting means is detected based on detection of said separate transmitting apparatus being placed in a predetermined location.

15. The data reproducing apparatus according to claim 10, further comprising:
switching means for performing switching operation when said separate transmitting means is placed in a predetermined location, and
wherein said receiving means starts a receiving operation in accordance with the switching operation of said switching means.

16. The data reproducing apparatus according to claim 15, wherein said switching means comprises:
first switching means for controlling power when said separate transmitting means is placed in said predetermined location; and
second switching means for controlling said power when said separate transmitting means is placed in said predetermined location.

17. The data reproducing apparatus according to claim 16, wherein said second switching means controls said power based on said data determination means determining whether the identification data extracted by said data extraction means is in a predetermined relationship with the identification data stored in said data storage means.

18. The data reproducing apparatus according to claim 16, wherein said first switching means controls said power based on said receiving means continuing to receive a data signal.

19. The data reproducing apparatus according to claim 10, further comprising:

means for detecting an approach of said separate transmitting means, wherein said data reproducing apparatus provides regenerated output of the audio data when the approach of said separate transmitting means is detected and the identification data is in said predetermined relationship.

20. The data reproducing apparatus according to claim 10, wherein an approach of said separate transmitting means is detected based on a receiving state of the data signal.

* * * * *